(12) United States Patent
Paterson et al.

(10) Patent No.: US 6,305,479 B1
(45) Date of Patent: Oct. 23, 2001

(54) WALL TIE REINFORCEMENT AND METHOD

(75) Inventors: Robert Ian Paterson, London (GB); Patrick John Sweeney, Ontario (CA)

(73) Assignee: Helifix Limited, London (GB)

( * ) Notice: Subject to any disclaimer, the term of this patent is extended or adjusted under 35 U.S.C. 154(b) by 0 days.

(21) Appl. No.: 09/527,891

(22) Filed: Mar. 20, 2000

Related U.S. Application Data

(60) Division of application No. 09/105,922, filed on Jun. 27, 1998, now Pat. No. 6,039,125, which is a continuation-in-part of application No. 08/870,708, filed on Jun. 6, 1997, now Pat. No. 5,772,375, which is a continuation-in-part of application No. 08/721,827, filed on Sep. 27, 1996, now Pat. No. 5,687,801, which is a continuation-in-part of application No. 08/491,358, filed on Jun. 30, 1995, now Pat. No. 5,586,605, which is a continuation-in-part of application No. 08/204,465, filed on Feb. 28, 1994, now abandoned.

(51) Int. Cl.[7] .................................................. E21D 20/02
(52) U.S. Cl. .............................. 173/1; 411/385; 411/425; 411/469
(58) Field of Search ........................... 173/4, 1; 411/425, 411/411, 469, 383, 386, 387, 388, 389, 385, 403

(56) References Cited

U.S. PATENT DOCUMENTS

| | | | |
|---|---|---|---|
| 862,522 | * 8/1907 | Silvius | 411/469 |
| 1,688,269 | * 10/1928 | Delaney et al. | 411/388 |
| 1,782,293 | * 11/1930 | Elliott | 411/403 |
| 1,844,823 | * 2/1932 | Rosenberg | 411/425 |
| 3,025,003 | * 3/1962 | Fortune | 411/425 |
| 4,307,979 | * 12/1981 | Killmeyer | 411/425 |
| 4,798,501 | * 1/1989 | Spies | 411/383 |

OTHER PUBLICATIONS

Helifix®—Stainless Steel Retrofit Wall Tie System—A four (4) page brochure publication printed and distributed on Jan. 1993.

Blok–Lok®Limited—Stainless Steel Retrofit Wall Tie System—A four (4) page brochure publication printed and distributed on Jan. 1993.

* cited by examiner

*Primary Examiner*—Scott A. Smith
(74) *Attorney, Agent, or Firm*—Jack E. Dominik

(57) ABSTRACT

A helical wedge tie, anywhere from 2½ inches to 4 inches in length, (which is approximately the width of a standard brick), can be utilized to wedgingly engage the mortar in a wall after a helical main tie has been passed all the way through the mortar and secured in the concrete. The wedge tie may have the same helical pitch as that of the main tie, or it may be a pitch somewhat tighter or shorter to not only fill the space between the host tie and the mortar, but wedgingly engage the same. The auxiliary wedge pin may be pointed at both ends, pointed at one end, or even blunt at both ends. Successful fixes have been made where one end is sheared, and has a relatively chisel-like end. The method of the invention is directed to the reinforcing of a tie in a wall reinforcing environment, where the outer portion of the tie passes through a softer material, and a subsequent reinforcement of the tie portion in the soft material becomes desirable.

4 Claims, 2 Drawing Sheets

WALL TIE REINFORCEMENT AND METHOD

RELATED APPLICATIONS

This Application is a second Divisional of Continuation-In-Part U.S. patent application Ser. No. 09/105,922, filed Jun. 27, 1998 now U.S. Pat. No. 6,039,125, which is in turn a Continuation-In-Part of U.S. patent application Ser. No. 08/870,708, filed Jun. 6, 1997, now U.S. Pat. No. 5,772,375, which Application is in turn a Continuation-In-Part of U.S. patent application Ser. No. 08/721,827, filed Sep. 27, 1996, now U.S. Pat. No. 5,687,801, which in turn is a Continuation-In-Part of U.S. patent application Ser. No. 08/491,358, filed Jun. 30, 1995, now U.S. Pat. No. 5,586,605, which in turn is a Continuation-In-Part of Ser. No. 08/204,465, filed Feb. 28, 1994 now abandoned.

FIELD OF THE INVENTION

This invention is directed to a wall tie reinforcement and method. The subject matter is useful in the restoration of buildings in which an outer wall such as brick is secured to an inner wall such as concrete and the bricks are losing their retention in the secured environment.

BACKGROUND OF THE INVENTION

The background of the present invention is illustrated in U.S. Pat. No. 5,586,605. More specifically, the background of the invention is shown in FIGS. 1, 2, 3, 7, 11, 12 and 13 of the subject patent where the wall contains a softer material on the outside, and a harder interior on the inside. The outer wythe of the wall is brick and mortar, and the same is secured in concrete. Where the tie is passed through the mortar, it will be seen that a two step or two diameter tie is recommended in the subject patents. Sometimes, a two step tie is not available at the job site, but it is still necessary to pass the helical tie through the mortar. Thus, it becomes highly desirable to have a "field fix kit" of the kind which will permit the tie specified for the job whether it be 4, 5, 6, 8 or 10 millimeters, or whether it be 75 millimeters and/or 100 millimeters in length. At job sites where a single tie is used, with a single diameter, and passing through a soft outer material such as mortar, the risk is that the joint will not survive a practical pull test, and where such joints might be ten to twenty percent of the project, a dangerous condition will be in the wall, despite the belief of those conducting the fix that adequate securement has been undertaken.

Particularly when random testing is to be undertaken, at the actual job site, a portion of the original helical tie may become loosened from the softer outer material. This can occur with ties which has been set into chemical resins, or initially dry fixed. After any such testing is made either in the back-up material or the exterior material, the tie which is in place needs to be reinforced.

In Applicant's related U.S. Pat. No. 5,687,801, there is disclosed an asymmetrical tie.

A larger portion of the tie is the later portion to be driven in, and normally will find itself in a mortar joint, or terra cotta, or other weaker exterior masonry, but the exterior needs to be engaged as firmly as the interior.

Not only is testing a problem, but in many instances, long lengths of tie need to be driven into soft or somewhat inconsistent materials like sandstone, multi-wythe brick, or terra cotta. With the vibration of the main tie, there is always the possibility that by the time the tie is set, engagement of the exterior portions do not have the necessary anchoring strength.

SUMMARY OF THE INVENTION

The present invention derives from the discovery that a short tie, anywhere from 2½ to 4" in length, (which is approximately the width of a standard brick), can be utilized to wedgingly engage the mortar or other softer portion in a wall after a tie has been passed all the way through the mortar and secured in the concrete. The auxiliary wedge tie may have the same helical pitch as that of the main tie, or it may be a pitch somewhat tighter or shorter to not only fill the space between the host tie and the mortar, but wedgingly engage the same. The auxiliary wedge tie may be pointed at both ends, pointed at one end, or even blunt at both ends. Successful fixes have been made where one end is sheared, and has a relatively chisel-like end. The method of the invention is directed to the reinforcing of a tie in a wall reinforcing environment, where the outer portion of the tie passes through a softer material, and a subsequent reinforcement of the tie portion by an auxiliary wedge tie in the soft material is made.

In view of the foregoing, the principal object of the present invention is to provide an auxiliary tie and method for reinforcing wall structures when a single size main tie will not provide for adequate securement in the outer softer wall portion.

A further object of the present invention is to provide the contractor and installer with an auxiliary kit which will permit the positioning of the main ties wherever preselected, and not be dependent upon a two step or a special type tie in order to complete the job satisfactorily.

Yet another object of the present invention is to provide for a helical tie inventory reduction for any job site in which an outer wall is being secured to an inner wall.

Another important object of the present invention is to provide an auxiliary reinforcing tie which is relatively inexpensive, particularly when the fact is that the forming of a two diameter tie involves additional forming steps and therefore increases the cost of the two dimensional tie, whereas with the auxiliary tie, the cost can be equalized and the flexibility of utilization in the field augmented.

DESCRIPTION OF THE DRAWINGS

Further objects and advantages of the present invention will become apparent as the following description of an illustrative embodiment proceeds, taken in conjunction with the accompanying drawings in which.

DESCRIPTION OF PREFERRED EMBODIMENT

Figure 1:
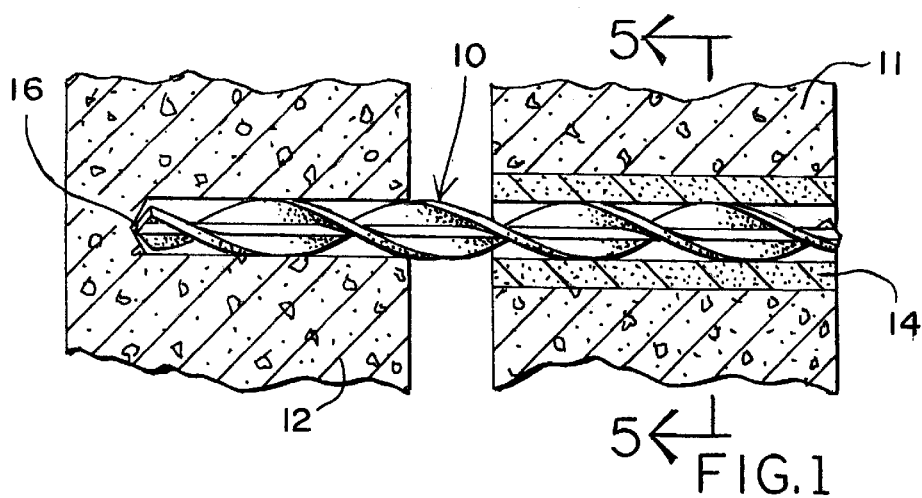
FIG. 1 illustrates a typical wall structure to be reinforced, shown in perspective and partially broken, with a single helical tie in place.

The environment of the present invention will be best understood in conjunction with FIG. 1 above. There it will be seen that the invention includes an outer wall of bricks, and a central wall of concrete. A main tie 10, as in FIG. 1, is driven through the outer wall wythe 11 into the inner wall wythe 12, and through the mortar joint 14 between the bricks. Subsequently, as shown in FIGS. 2 and 3, the auxiliary wedge tie 20 is impactingly inserted into the wall in adjacent relationship to the main tie 10.

Figure 2:
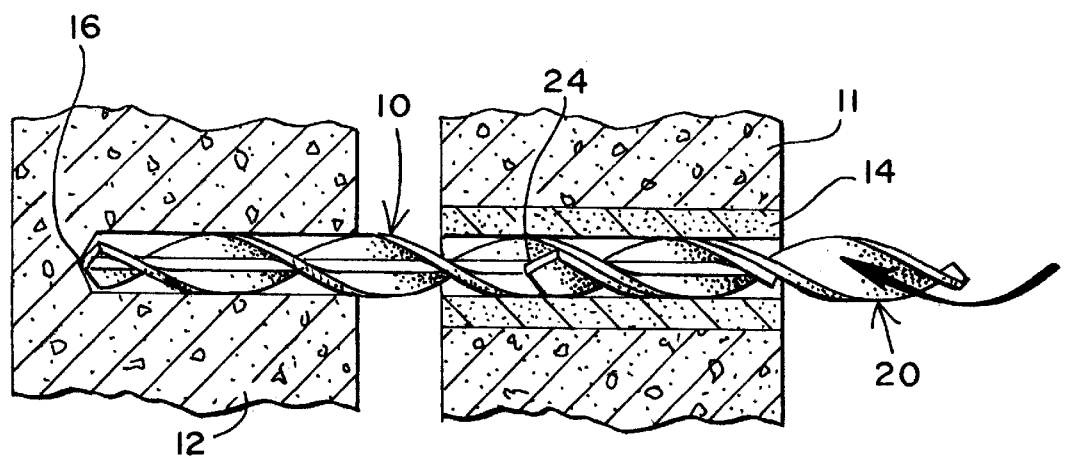
FIG. 2 shows the same wall as in FIG. 1 with a single tie positioned therein, but without adequate engagement with the mortar through which the tie is passed, with the second auxiliary tie partially in place.
Figure 3:
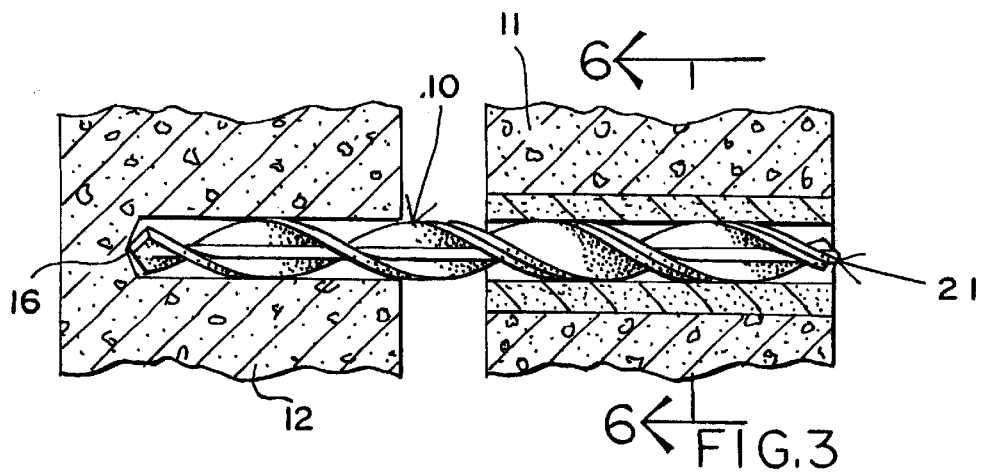
FIG. 3 is a transverse sectional view like that of FIGS. 1 and 2, but showing the auxiliary tie totally in place.
Figure 6:
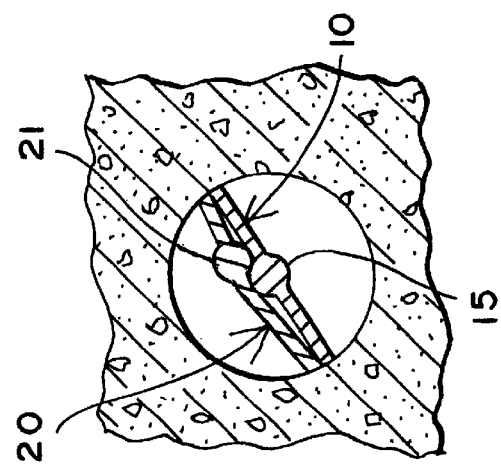
FIG. 6 is a transverse sectional view taken along section line 6—6 of FIG. 3.
Figure 5:
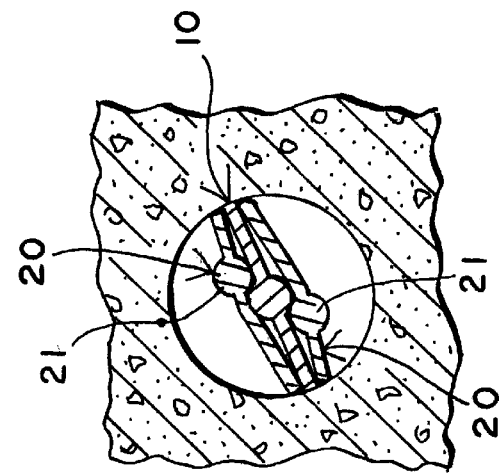
FIG. 5 is a transverse sectional view taken along section line 5—5 of FIG. 1.

As shown in FIGS. 2 and 3, the auxiliary wedge tie 20 lies flat against the main tie 10. It will be seen that the core rod portion 11 of the main tie 10 off-settingly flanks the tie rod portion 21 of the auxiliary wedge tie 20. The point 16 of the main tie 10 is beveled and pointed to penetrate the entire wall. The reinforcing rod portion 21 of the auxiliary wedge tie 20 lies next to the rod portion 15 of the host tie 10. This occurs when the helix of the auxiliary wedge tie 20 is the same as that of the helix of the main tie and auxiliary tie 10–20. It is to be noted in FIGS. 3 and 4 that the leading edge 24 of the auxiliary wedge tie 20 is pointed like the main tie 10. An alternative embodiment showing a blunt forward edge 25 of the auxiliary wedge tie 20 is in FIG. 6.

It will be understood that the main tie 10 is essentially the same as that employed in all of the related earlier Applications, but in a symmetrical form. It is pointed at both ends. In the formation of the subject ties 10, a ribbon is twisted to the desired pitch, the tie severed, and then one or both ends is/are pointed. In the manufacturing process for large quantities of the wedge ties 20, the long ribbon can be repeatedly severed with a flat or blunt edge at each end. This is the most economical method for forming the auxiliary wedge tie 20. Alternatively, while in the field, the tradesman can actually take a longer helical tie, and grind off or shear a portion leaving an auxiliary wedge tie 20. In addition, if the main tie the tradesman is using is an 8 inch tie, it can be cut in half to form a two 4 inch auxiliary ties. Optionally, the leading end can be ground to a finer point, or driven in blunt fashion.

It is preferred that the pitch of the auxiliary wedge tie 20 be the same as that of the main tie 10. Because the pitch varies in accordance with the diameter of the ties, which may be 4.5, 6, 8, or 10 millimeters, then it is desirable that the auxiliary wedge tie 20 also be of the same diameter as the main tie. In certain particularly soft applications, a smaller diameter auxiliary wedge tie 20 may be employed, since the deformation of the hole which is penetrated will be somewhat larger, and hence the gripping aspect enhanced. As to material, the auxiliary wedge tie 20 should be formed of the same material of the host tie 10 to avoid any electrolysis or degradation which might result from a material differentiation.

Figure 4:
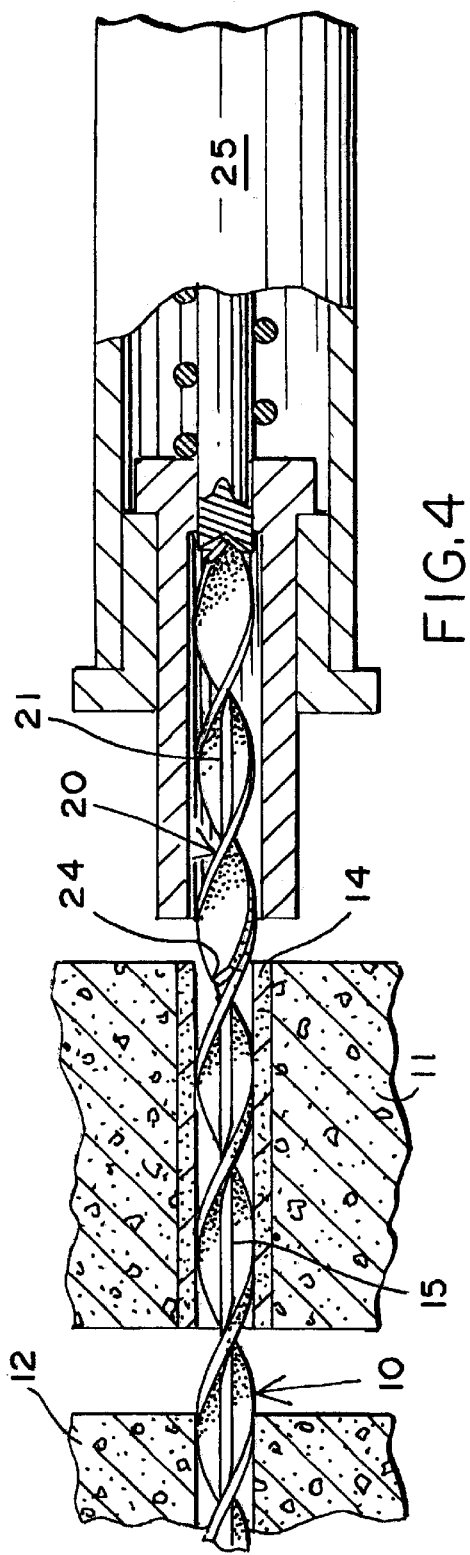
FIG. 4 is a longitudinal sectional view of the adapter showing how it is engaged with the wedge tie for impactingly inserting the same.
Figure 7:
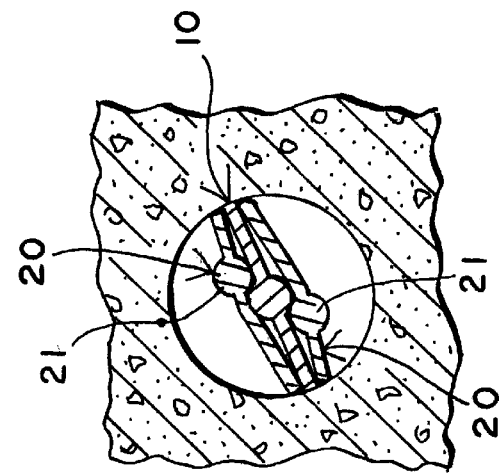
FIG. 7 shows the use of two auxiliary ties.

The impacting tool 25, as shown in FIG. 4, is formed, proportioned, and designed essentially the same as that disclose in the Parent Patent and/or Parent Applications.

The method of the present invention resides in the steps of initially selecting a main tie 10 for the job site which will penetrate the two portions of the wall to be secured. Thereafter, a determination is made of the size of the auxiliary wedge tie 20 which may be employed. Once the main tie 10 is in position and the preselected auxiliary wedge tie 20 is impactingly engaged by the adapter, as disclosed in U.S. Pat. No. 5,687,801, or other suitable adapters to which engage it, it is inserted along the host tie 10. Optionally, but only in accordance with the site dictates, with the contractor or installation crew, a pair of auxiliary wedge ties 20 may be positioned on opposite sides of the host tie 10.

While materials are not considered critical to the present invention, desirably the auxiliary wedge tie 20 is formed of a stainless steel specified as Grade 304, in lengths of 6, 10 and 12 centimeters and 6, 8 and 10 millimeters diameter. The preferred helix is one revolution for every 4 centimeters. This may be increased to 5 centimeters or reduced to 2.5 centimeters. Desirably the auxiliary tie has the same helix of the main tie 10, but this can be varied in limited amounts to provide a wedging effect, particularly in wall structures where a shorter auxiliary tie may be employed.

It will be understood that various changes in the details, materials and arrangements of parts, or method which have been herein described and illustrated in order to explain the nature of the invention, may be made by those skilled in the art within the principle and scope of the invention as expressed in the appended claims.

What is claimed is:

1. An auxiliary helical wedge tie for use with a main helical tie for use in masonry reinforcing by securing an outer wall to an inner wall, said helical auxiliary tie being characterized by:

a length that is less than half of that of the main helical tie;

a helical body portion substantially identical to or smaller in diameter than the main helical tie;

a leading edge and a trailing edge on said auxiliary tie formed for said leading edge to penetrate secondarily the outer portion of the outer wall secured by the main tie, and, said trailing edge portion adapted to engage an impacting driving means for driving the auxiliary tie into the wall adjacent to the main tie.

2. An auxiliary helical wedge tie for use with a main helical tie for reinforcing two or more masonry walls which tie has a helical body and two ends, one end being an outer end, and one end being an inner end which is pointed, said main tie being formed and proportioned to connect two or more walls, one of which is an outer wall having a width to reinforce the main helical tie between the same, said auxiliary helical wedge tie formed with the same cross-sectional shape of the main tie body but cut to a length to approximate the width of the outer wall in which one end of the auxiliary helical tie is pointed, and thereafter impactingly driven through the outer wall adjacent to the main helical tie.

3. The auxiliary helical wedge tie according to claim 2, said auxiliary tie being formed by cutting to length a tie identical to the main tie to be reinforced.

4. In the auxiliary helical wedge tie according to claim 3, the point portion of the auxiliary helical wedge tie has a pointed end which has been formed in substantially the same fashion as the main tie pointed end.

* * * * *